United States Patent
Weiss et al.

(10) Patent No.: US 10,308,196 B2
(45) Date of Patent: Jun. 4, 2019

(54) METHOD FOR TRANSMITTING MEASURED VALUES FROM A SENSOR, COMPUTER PROGRAM, MACHINE-READABLE STORAGE MEDIUM AND SENSOR

(71) Applicant: Robert Bosch GmbH, Stuttgart (DE)

(72) Inventors: Guenter Weiss, Walheim (DE); Marlon Ramon Ewert, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/830,045

(22) Filed: Dec. 4, 2017

(65) Prior Publication Data
US 2018/0154845 A1 Jun. 7, 2018

(30) Foreign Application Priority Data

Dec. 6, 2016 (DE) .................... 10 2016 224 187

(51) Int. Cl.
*B60R 16/023* (2006.01)
*H04L 12/40* (2006.01)
*H04L 29/08* (2006.01)
*H04Q 9/02* (2006.01)
*H04Q 9/00* (2006.01)

(52) U.S. Cl.
CPC ............ *B60R 16/023* (2013.01); *H04L 12/40* (2013.01); *H04L 29/08* (2013.01); *H04L 67/12* (2013.01); *H04Q 9/00* (2013.01); *H04Q 9/02* (2013.01); *H04L 2012/40215* (2013.01); *H04L 2012/40273* (2013.01); *H04Q 2209/10* (2013.01); *H04Q 2209/30* (2013.01); *H04Q 2209/40* (2013.01); *H04Q 2209/753* (2013.01)

(58) Field of Classification Search
CPC .................................................... B60R 16/023
USPC .................................................... 340/870.01
See application file for complete search history.

(56) References Cited

U.S. PATENT DOCUMENTS

2007/0273491 A1* 11/2007 Recknagel .............. B60R 21/01
340/436
2014/0253071 A1* 9/2014 Hammerschmidt ...... G05F 1/10
323/280

* cited by examiner

*Primary Examiner* — Qutbuddin Ghulamali
(74) *Attorney, Agent, or Firm* — Maginot, Moore & Beck LLP

(57) ABSTRACT

A method for transmitting measured values from a sensor, wherein the measured values are transmitted cyclically, wherein at least two communication slots are provided in one communication cycle, wherein a first measured value, which represents a first physical effect detected by the sensor, is transmitted in a first communication slot, and a second measured value, which represents a second physical effect detected by the sensor, is transmitted in a second communication slot, characterized in that the measured value is transmitted in a communication cycle according to a defined relevance of the currently detected physical effect and/or of the measured value.

9 Claims, 1 Drawing Sheet

METHOD FOR TRANSMITTING MEASURED VALUES FROM A SENSOR, COMPUTER PROGRAM, MACHINE-READABLE STORAGE MEDIUM AND SENSOR

This application claims priority under 35 U.S.C. § 119 to application no. DE 10 2016 224 187.7, filed on Dec. 6, 2016 in Germany, the disclosure of which is incorporated herein by reference in its entirety.

The present disclosure relates to a method for transmitting measured values from a sensor, and also relates to a corresponding computer program and machine-readable storage medium and to a corresponding sensor.

BACKGROUND

Sensors built into the vehicle fender are used to detect accidents involving pedestrians. Systems based on two or more acceleration sensors are common.

Recently available are systems based on a pressure tube for detecting accidents involving pedestrians.

Both for the acceleration-based systems and for the pressure-tube-based systems, the impact of an object in the relevant region of the fender results in a signal rise inside the detecting sensors.

The amplitude of the detected signals depends, amongst other factors, on the mass and speed of impact of the object involved in the impact.

Nowadays either pressure sensors or acceleration sensors are used for detecting collisions to the side. Acceleration sensors are typically located on the B-pillar, C-pillar or D-pillar of the vehicle. Pressure sensors are typically arranged in the vehicle door.

Acceleration sensors are used today for detecting frontal collisions. These sensors are typically located at a control unit arranged in the center of the vehicle and are also located along the bending crossmember of the vehicle.

The signals output by the sensors undergo further processing by procedures performed by the control unit. If the procedure ascertains from the signals a pedestrian being hit, a lateral collision or a frontal collision, then restraining means (e.g. an airbag) are activated in the vehicle according to the processing result from the procedure in order to protect the pedestrian in the event that a pedestrian is hit, or, in the event of a collision, to protect the vehicle occupants.

There are a vast range of transmission standards available for transmitting the signals from the sensors used. One of these standards is the standard based on the Peripheral Serial Interface 5 (PSI5).

PSI5 is an open standard initiated by the companies Autoliv, Robert Bosch GmbH and Continental AG. Based on the earlier PAS4 protocol, PSI5 supports applications in which it is possible to poll up to 4 sensors per bus node in various configurations. There is also provision for bidirectional communication for the purpose of sensor configuration and diagnostics.

In airbag systems, data from pressure sensors and acceleration sensors, for example, is evaluated via current-modulated two-wire bus lines, which use a Manchester-coded protocol to communicate with the control unit.

The standard also specifies a plurality of operating modes. These are classified primarily into synchronous and asynchronous operating modes. For synchronous operation, the following three operating modes are defined according to how the sensors are connected to the control unit: Parallel BUS mode (all the sensors are connected in parallel), Universal BUS mode (sensors connected in series) and Daisy Chain BUS mode. Combined with other parameters such as the total number of communication slots, data rate, data word length, parity/CRC monitoring, the PSI5 standard allows a range of implementation options. The 10-bit data word length is widely used.

Sensors used today that transmit measured values according to the PSI5 standard typically use a single PSI5 communication slot for data transmission of the measured values to a receiver, for instance to a control unit. This means that such a sensor communicates in a single PSI5 communication slot within a PSI communication bus. Exceptions are two-channel sensors, where the measured values from one sensor detection means (for instance X-direction) are transmitted on one channel, while the measured values from another sensor detection means (for instance Y-direction) are transmitted on a second channel. In this case, the corresponding sensor needs more current for data transmission, and, for example, there is a greater temperature rise inside the sensor. Such sensors must have a suitable structural design in order to dissipate the resulting thermal load reliably via the sensor housing, for instance. This potentially results in increased costs.

SUMMARY

Against this background, the present disclosure provides a method for transmitting measured values from a sensor, wherein the measured values are transmitted cyclically, wherein at least two communication slots are provided in one communication cycle, wherein a first measured value, which represents a first physical effect detected by the sensor, is transmitted in a first communication slot, and a second measured value, which represents a second physical effect detected by the sensor, is transmitted in a second communication slot, wherein the measured value is transmitted in a communication cycle according to a defined relevance of the currently detected physical effect and/or of the measured value.

A communication cycle is understood to mean here a communication sequence that is designed such that the sensor transmits repeatedly detected measured values. Typically, at least the start time of a communication cycle is indicated, for example in the form of a synchronization pulse. Such a synchronization pulse is typically emitted by a control unit to which the sensor transmits the detected measured values.

A communication slot is here a portion of a communication cycle. A communication cycle typically comprises a plurality of communication slots. The time length of a communication slot is typically specified, with the result that the sequence and the start time of each communication slot after the start of the communication cycle are fixed. In communication configurations in which a plurality of transmitters transmit, or in which one transmitter transmits a plurality of types of data to one or more receivers, each transmitter is allocated one or a corresponding plurality of communication slots, inside which the transmitter can perform its transmissions.

A sensor is understood to mean here a device that detects a physical effect and conditions the detected effect in a suitable representation, preferably in digital form, and is configured to transmit the detected physical effect as a measured value.

A physical effect can be here, for example, a linear or radial acceleration. The physical effect can also be a pressure, a pressure change or a temperature. In addition, the physical effect could be a position, a time or electromagnetic radiation both in the wavelength region visible to the human eye and also in the non-visible wavelength region.

Relevance is understood to mean here the relevance of the physical effect to the application that receives and processes the detected measured value. Hence the relevance in this case is a primarily definable or defined relevance.

In an embodiment of the method according to the disclosure, the detected physical effect and/or the measured value are conditioned for transmission according to the relevance.

This embodiment is based on the finding that a physical effect a measured value having a lower relevance needs to be conditioned or computed for transmission less frequently. This embodiment has the advantage that computational effort in the sensor can be reduced. Furthermore, the computational effort in a control unit to which the sensor transmits the conditioned measured value can be reduced.

Reduced computational effort results in lower energy consumption and hence, in an electrical and/or electronic system, inevitably to less current consumption and consequently to a lower thermal load.

Conditioning of the detected physical effect and/or of the measured value is understood to mean here the procedure that must be carried out in order to convert a physical effect detected by a sensor element of the sensor into a representation, preferably into a digital representation, that is suitable to being transmitted.

In one embodiment of the method according to the present disclosure, the relevance of the physical effect depends on the detection rate of the physical effect by the sensor.

This embodiment has the advantage that the relevance of the physical effect is determined, or the definable or defined relevance is adapted, according to the detection rate of the physical effect.

A detection rate is understood to mean here primarily the repetition rate at which the sensor measures the physical effect or prepares for transmission a measured value derived from the measurement.

In another embodiment of the method according to the present disclosure, the relevance of the physical effect depends on the dynamic behavior of the physical effect. It is thereby possible to automate further the determination or adaptation of the relevance.

This embodiment has the advantage that the relevance of the physical effect is determined, or the definable or defined relevance is adapted, according to the dynamic behavior of the physical effect.

A dynamic behavior of the physical effect is understood to mean here the rate of change of the physical effect under normal conditions. Thus, for example, the ambient temperature or the ambient pressure in an application in the automotive sector is relatively static, in other words is associated with a relatively low rate of change and hence a low dynamic behavior. In comparison, the acceleration or the change in pressure exhibits a far higher rate of change and hence a higher dynamic behavior.

According to another embodiment of the method of the present disclosure, a communication channel for transmission in a communication slot is set up only if a measured value is transmitted in the communication slot. The sensor comprises for this purpose a device for setting up a communication channel for transmitting the measured values.

This embodiment has the advantage that energy for setting up and maintaining the communication channel can thereby be saved because the communication channel is set up only when communication is actually taking place, and/or is switched off when no communication is taking place. Said setting-up of the communication channel can be performed here per communication slot. In other words, within a communication cycle, a communication channel may be set up for the one communication slot, and may not be set up and/or may be switched off for another communication slot if no measured values are meant to be transmitted in this communication slot. In particular when using current interfaces as the communication means, such as is the case for the PSI5 standard, for example, the current consumption in the sensor for conditioning, preparing and transmitting the measured values can be reduced by this embodiment. The fact that there is less current consumption in the sensor means that a thermal load in the sensor resulting from the heat produced by the current flow is lower. Hence in terms of materials, the sensor can be designed for a lower thermal load, resulting in savings in materials and weight.

Another aspect of the present disclosure is a computer program, which is designed to perform all the steps of the method according to the present disclosure.

Another aspect of the present disclosure is a machine-readable storage medium, in which is stored the computer program according to the present disclosure.

Another aspect of the present disclosure is a sensor, which is designed to perform all the steps of the method according to the present disclosure.

According to one embodiment of the sensor, the sensor comprises a device for setting up and/or switching off a communication channel for transmitting the measured values, and is configured to perform the last-described embodiment of the method according to the disclosure.

According to this embodiment, the sensor can set up and/or switch off a communication channel according to the relevance of the detected physical effect and/or of the measured value.

As explained above with regard to the corresponding embodiment of the method according to the present disclosure, this embodiment results in the sensor having a particularly low energy consumption and consequently in a reduced current consumption. The reduced current consumption in the sensor results in a lower thermal load from the heat produced by the current flow. Hence in terms of materials, the sensor can be designed for a lower thermal load, resulting in savings in materials and weight.

BRIEF DESCRIPTION OF THE DRAWINGS

Embodiments of the present disclosure are presented and explained below with reference to figures, in which.

DETAILED DESCRIPTION

Figure 1:
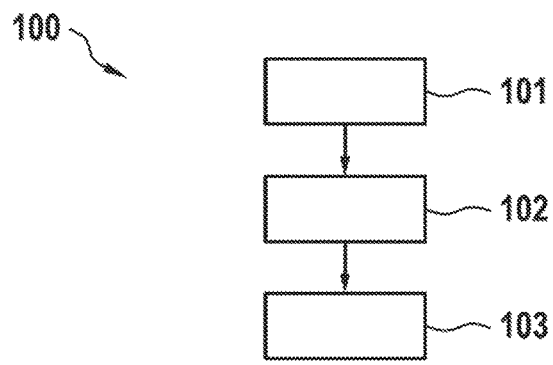
FIG. 1 is a flow diagram of an embodiment of the method according to the present disclosure.

FIG. 1 shows a flow diagram of an embodiment of the method 100 according to the present disclosure.

In step 101, the sensor element 21, 22 of the sensor 20 detects a physical effect.

In step 102, a conditioning device 23 of the sensor 20 conditions the detected physical effect to be a measured value for transmission. Said conditioning or computation is performed here according to the relevance of the detected physical effect.

In step 103, the measured value is transmitted by means of an interface device 24 of the sensor 20 via a communication channel K. Said transmission is performed here additionally or alternatively according to the relevance of the detected physical effect and/or of the measured value.

Figure 2:
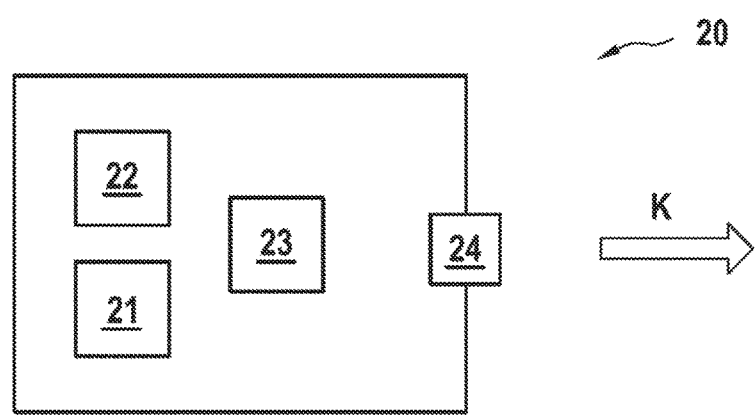
FIG. 2 is a block diagram of an embodiment of a sensor according to the present disclosure.

FIG. 2 shows a block diagram of an embodiment of a sensor 20 according to the present disclosure.

The sensor 20 shown in FIG. 2 comprises, for example, a first sensor element 21 and a second sensor element 22. The first sensor element 21 can be designed, for example, to detect the ambient pressure. The second sensor element 22 can be designed, for example, to detect the ambient temperature. Such a configuration is not uncommon in pressure sensors for vehicles intended for detecting a collision. Such sensors are usually referred to as peripheral pressure sensors (PPS) and are typically located in a suitable cavity in the side wall of a vehicle, preferably in the vehicle door.

In the known peripheral pressure sensors, one or more conditioning devices 23 condition the measured values of the pressure signal and of the temperature signal for each communication cycle to be a transmittable measured value.

Such a conditioning device 23 might be embodied, for example, as an application-specific integrated circuit (ASIC) or as a microcontroller or as a discrete circuit.

The measured values conditioned in this way are then transmitted in communication cycles by means of a suitable interface device 24. Such an interface device 24 may in this case be part of the ASIC that constitutes the conditioning device 23, or can be a separate discrete or integrated electrical or electronic component.

CAN, K-Line or even PSI5 have become established in the automotive sector as standard transmission protocols. Equally possible are wired or wireless transmission standards based on Ethernet or the like.

When PSI5 is used, the pressure signal can be transmitted in a first communication slot, and the temperature signal in a second communication slot.

Regardless of whether the second sensor element 22 is suitable for detecting the ambient temperature at approximately the same detection rate as the first sensor element 21 detects the ambient pressure, the pressure signal still has a greater relevance to the subsequent processing in a control unit intended for triggering personal protection means (airbag control unit). Hence according to the present disclosure, a greater relevance can be given to the pressure signal than to the temperature signal. Thus according to the present disclosure, the pressure signal is transmitted in more communication cycles than the temperature signal. For instance, the pressure signal could be transmitted in every communication cycle. In contrast, the temperature signal might be transmitted only in every 50th communication cycle.

What is claimed is:

1. A method for operating a sensor, the method comprising:
   cyclically electronically transmitting measured values generated by the sensor to a control unit operably connected to the sensor;
   providing at least two communication slots in one communication cycle;
   electronically transmitting a first measured value, which represents a first physical effect detected by the sensor, in a first communication slot of the at least two communication slots;
   electronically transmitting a second measured value, which represents a second physical effect detected by the sensor, is transmitted in a second communication slot of the at least two communication slots; and
   electronically transmitting each measured value of the measured values in a respective communication cycle to the control unit based on a defined relevance of one of (i) a currently detected physical effect and (ii) the respective measured value,
   wherein the measured values having a lower relevance are transmitted less frequently to the control unit to reduce a computational effort of the sensor during the electronic transmitting and to reduce energy consumption of the sensor, thereby lowering a thermal load of the sensor.

2. The method as claimed in claim 1, further comprising: conditioning the one of (i) the currently detected physical effect and (ii) the respective measured value for transmission based on the defined relevance.

3. The method as claimed in claim 1, wherein the defined relevance of the currently detected physical effect depends on the detection rate of the currently detected physical effect by the sensor.

4. The method as claimed in claim 1, wherein the defined relevance of the currently detected physical effect depends on a dynamic behavior of the currently detected physical effect.

5. The method as claimed in claim 1, wherein the sensor comprises a device configured to set up a communication channel to transmit the measured values, the communication channel being set up in a communication slot only when a measured value of the measured values is transmitted in the communication slot.

6. The method as claimed in claim 1, wherein the method is implemented by a non-transitory computer program.

7. The method as claimed in claim 1, wherein the computer program is stored on a non-transitory machine-readable storage medium.

8. A sensor configured to:
   cyclically electronically transmit measured values generated by the sensor to a control unit operably connected to the sensor;
   provide at least two communication slots in one communication cycle;
   electronically transmit a first measured value, which represents a first physical effect detected by the sensor, in a first communication slot of the at least two communication slots;
   electronically transmit a second measured value, which represents a second physical effect detected by the sensor, is transmitted in a second communication slot of the at least two communication slots; and
   electronically transmit each measured value of the measured values in a respective communication cycle to the control unit based on a defined relevance of one of (i) a currently detected physical effect and (ii) the respective measured value,
   wherein the measured values having a lower relevance are transmitted less frequently to the control unit to reduce a computational effort of the sensor during the electronic transmitting and to reduce energy consumption of the sensor, thereby lowering a thermal load of the sensor.

9. The sensor as claimed in claim 8, further comprising: a device configured to at least one of set up and switch off a communication channel to the measured values, the communication channel being set up in a communication slot only when a measured value of the measured values is transmitted in the communication slot.

* * * * *